United States Patent

[11] 3,569,944

[72] Inventor John E. Bigelow
Schenectady, N.Y.

[21] Appl. No. 717,848
[22] Filed Apr. 1, 1968
[45] Patented Mar. 9, 1971
[73] Assignee General Electric Company

[54] METHOD OF OPTICAL RECORDING OF BINARY CODES
21 Claims, 7 Drawing Figs.

[52] U.S. Cl. .......... 340/173, 96/1, 350/162
[51] Int. Cl. .......... G11c 13/04
[50] Field of Search .......... 346/74; 340/173; 178/6.6; 96/1

[56] References Cited

UNITED STATES PATENTS

| | | | |
|---|---|---|---|
| 2,050,417 | 8/1936 | Bocca | 88/16.4 |
| 2,813,146 | 11/1957 | Glenn | 178/6.6 |
| 3,312,955 | 4/1967 | Lamberts | 340/173 |
| 3,314,052 | 4/1967 | Lohnmann | 340/173 |
| 3,325,789 | 6/1967 | Glenn | 340/173 |

*Primary Examiner*—Terrell W. Fears
*Attorneys*—Richard P. Brainard, Marvin Snyder, Paul A. Frank, Frank L. Neuhauser, Melvin M. Goldenberg and Oscar B. Waddell

ABSTRACT: A system for storing and retrieving data in the form of unique sets of superimposed angularly oriented optical diffraction gratings, each set of gratings representing a different symbolic character. Each selected character is stored by optically recording the set of gratings associated therewith. Typically, a set of characters representing an address is recorded together with each group of characters representing stored information. Readout is accomplished by comparing quickly the stored sets of characters representing different addresses with an address called for by the system. When the desired address is located, the system reads out all recorded data associated therewith.

Inventor:
John E. Bigelow,
by Marvin Snyder
His Attorney.

Inventor:
John E. Bigelow,
by Marvin Snyder
His Attorney.

Patented March 9, 1971 3,569,944

5 Sheets-Sheet 3

Inventor:
John E. Bigelow,
by Marvin Snyder
His Attorney.

Inventor:
John E. Bigelow,
by Marvin Snyder
His Attorney.

Patented March 9, 1971 3,569,944

5 Sheets-Sheet 5

Inventor:
John E. Bigelow,
by Marvin Snyder
His Attorney.

METHOD OF OPTICAL RECORDING OF BINARY CODES

INTRODUCTION

This invention relates to a system for storing and retrieving coded information, and more particularly to a method and apparatus for optically recording and retrieving data in the form of sets of light diffraction gratings of selected orientation.

In systems for recording a high density of binary digits or bits, the space allocated to each bit must be very small. This creates the problem of achieving very high precision in addressing a given bit, and also increases the chance of errors due to minute flaws in the recording material. As a partial solution to these problems, it has been found possible to record a small light diffraction grating within a restricted space as a representation of a set of bits to be stored. The stored bits are contained in the variation of spacing between the lines of the grating. To read out the stored data, monochromatic light, which is made to impinge upon the stored set of bits in the form of a grating, is diffracted by the grating by an angle which is determined by the spacings of the grating lines to form a first order diffraction image. One drawback to such system however, is that no greater than a 2-to-1 ratio of variation in spacings can be used without causing the second order diffraction image to interfere with the first order diffraction image. Moreover, apparatus presently available provides resolution capability of eight line pairs in the space of a single set of bits, meaning that only seven bits can be recorded reliably in that space. Further, if the source is only approximately monochromatic, the span of its wavelengths must be restricted to no more than one-sixteenth of the value of the wavelength.

The present invention permits high density recording without the aforementioned drawbacks. This is accomplished by imparting a predetermined unique angular orientation to the diffracted image of each bit in a set of bits to be recorded, and superimposing the angularly oriented diffraction images of each bit in the set on a strip of optical recording material. This permits simultaneous readout of each bit in the set by detecting light in the diffraction image plane at the first order diffraction image location. The light is detected at predetermined angularly oriented locations and, by employing detecting means at each of the locations, the entire set of recorded bits may be detected simultaneously. By recording each set of bits in its own separate location on the recording medium, high speed data readout with high reliability can be achieved.

In the present invention, each set of bits is utilized to represent a particular character such as might appear on a standard typewriter or teletypewriter keyboard. By utilizing an eight-bit code, each character in a group of up to 128 different characters may be uniquely defined and each of the characters may also be checked for parity, the parity check requiring but a single bit. The complete set of eight bits comprises a selection from a set of eight diffraction gratings oriented, for example, at angles displaced from each other by 22½°. For purposes of this application, it will be assumed that the gratings are situated at angles of 0°, 22½°, 45°, 67½°, 90°, 112½°, 135°, and 147½°. Each bit in any set comprises a ONE or a ZERO, depending on whether the grating having the predetermined angular orientation for that particular bit is present or absent. Accordingly, the 0° bit is a ONE if the 0° grating is present, but is a ZERO if the 0° grating is absent. Similarly, the 22½° bit is a ONE if the 22½° grating is present, but is a ZERO if the 22½° grating is absent, etc.

Storage of data is accomplished by individually selecting each character to be stored from a rapidly rotating disc on which are contained all characters for storage together with the gratings respectively associated therewith. Each selection is made by flashing a pulse of light through the gratings representing the character selected for storage and, if desired, by simultaneously flashing a separate pulse of light through a transparency in the disc of the character itself. Because of the high rotational speed of the disc, typically 15,000 revolutions per minute, characters may be selected for storage at a high rate of speed, typically 250 characters per second. The gratings representing the characters selected for storage, together with the characters themselves, if desired, are stored by impinging their optical images on an optical recording medium, such as a photoconductive thermoplastic film of the type shown and described in U.S. Pat. No. 3,291,601, issued Dec. 13, 1966 to J. Gaynor and assigned to the instant assignee. This film is promptly processed so as to render the recorded data nonvolatile, permitting indefinite storage thereof. Such processing for film of the type described in U.S. Pat. No. 3,291,601 to Gaynor is described in detail therein.

Each group of data selected for storage is preceded by a unique combination of a predetermined number of characters which comprise an address for that group of data. The address facilitates rapid retrieval of the desired data regardless of its location on the film since the address itself can be located quickly by a brief address search because of the relatively small numbers of addresses stored on the film.

Once the desired address has been located, the system rapidly reads out all data associated with that address by repeatedly scanning a light beam across the film in a direction normal to the direction of travel of the film and, after each complete scan but prior to initiation of the next scan, advances the film by a single increment. The first order images of light diffracted by the gratings recorded on the film are detected by an array of photodetectors which convert the detected light into electrical impulses, each detector being responsive to a grating of predetermined angular orientation and producing an electrical signal corresponding to the bit representative of diffracted light with that angular orientation. Because each character is stored in the form of gratings of different angular orientation, it is possible to read out simultaneously all the bits which comprise any one character. These bits, in the form of electrical impulses, are transmitted to information processing or printout apparatus, situated either locally or at one or more remote stations. Transmission occurs sequentially, one character after another, and is not halted until all the data associated with the desired address have been read out.

Accordingly, one object of this invention is to provide a simple, rapid access, optical data storage and retrieval system capable of high-speed operation.

Another object is to provide a method and apparatus for optically achieving high density storage of discrete data without need for a highly monochromatic light source.

Another object is to provide a method and apparatus for unambiguously identifying characters of data to be stored and read out by employing superimposed optical gratings of predetermined angular orientation uniquely associated with each of the respective characters.

Briefly, in accordance with a preferred embodiment of the invention, a method for storing data and retrieving selected portions of said stored data is described. The method comprises recording a first plurality of sets of superimposed optical diffraction gratings of predetermined angular orientations, each set of gratings representing an address character to be stored. A second plurality of sets of superimposed optical diffraction gratings of predetermined angular orientations are recorded in association with the first plurality of sets of superimposed optical diffraction gratings. Each set of gratings of the second plurality represents a data character to be stored. Each angular orientation of diffracted light associated with each one of the first plurality of sets of superimposed diffraction gratings is sensed, and the sensed gratings are indicated by electrical impulses. Thereafter, each angular orientation of diffracted light associated with each one of the second plurality of sets of superimposed diffraction gratings is sensed and electrical impulses are produced in accordance with the sensed gratings of the second plurality.

In accordance with another preferred embodiment of the invention, a system for storing data and retrieving desired portions of said stored data is provided. The system comprises light sensitive recording means for recording patterns corresponding to patterns of light imaged thereon, and input means for optically imaging in sequence selected ones of unique sets of superimposed diffraction gratings, each grating in any set having a unique angular orientation, onto separate regions respectively of the recording means. Transducer means responsive to light emanating from each one of the superimposed diffraction gratings in each set of recorded gratings in any selected sequence of sets of recorded gratings are also provided in order to produce an electrical signal corresponding to each grating present in the selected sequence of sets of recorded gratings.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
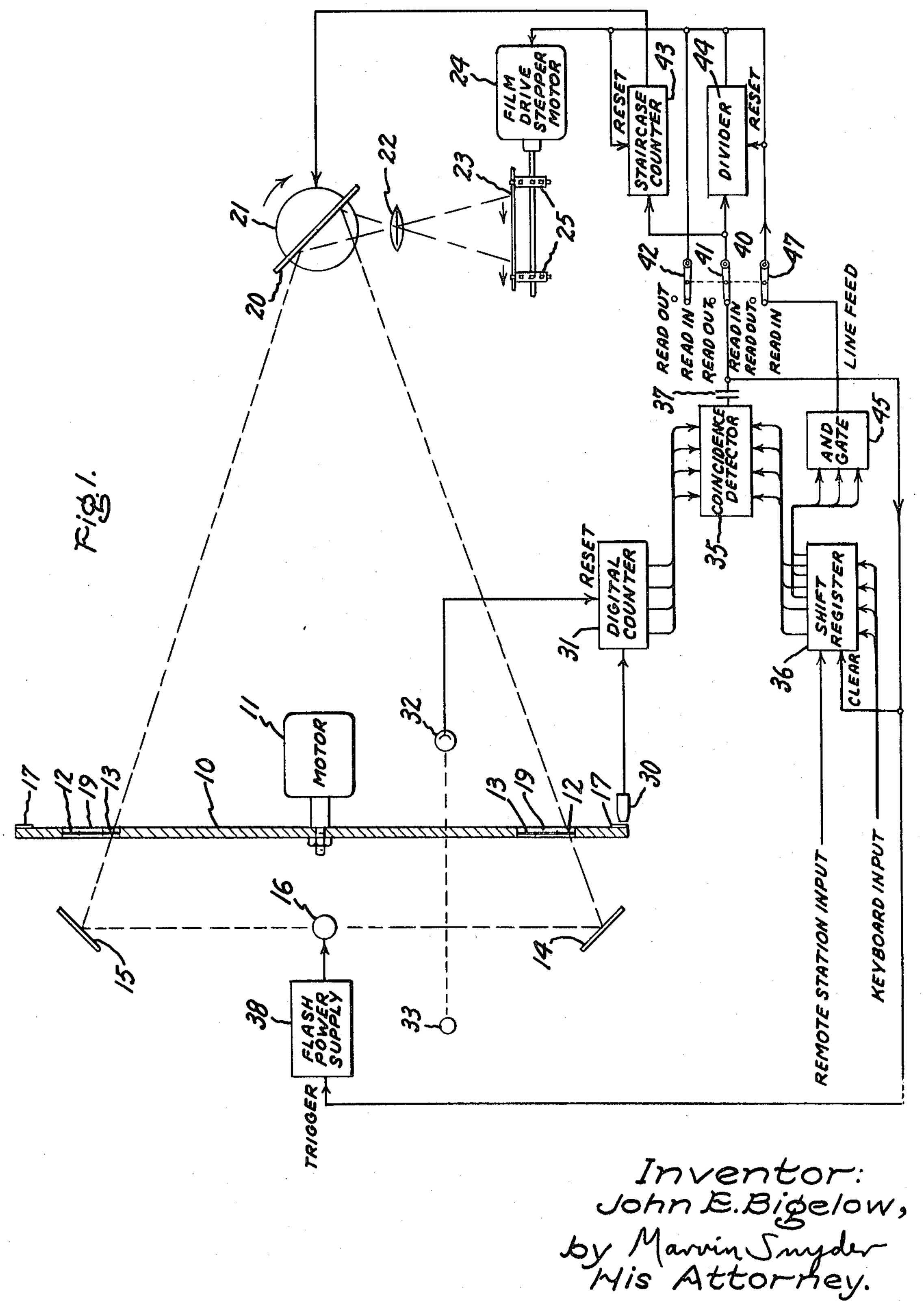
FIG. 1 is a schematic diagram of apparatus employed for data into storage in the system of the instant invention.

In FIG. 1, apparatus for reading data into storage is illustrated. This apparatus comprises a circular disc 10 driven by a motor 11, conveniently a synchronous motor. The disc, which is preferably driven at a speed of 15,000 revolutions per minute, carries a series of transparencies 19 mounted therein and arranged in a circle concentric with the disc. Arranged on transparencies 19 are characters 12 to be recorded, and diffraction gratings 13, with gratings 13 forming a circle concentric with the disc, but of smaller diameter than a circle formed by characters 12. A pair of mirrors 14 and 15 are fixedly situated on one side of disc 10, diametrically opposite to each other, to reflect light from a high-speed flash lamp 16, which is typically of the xenon filled type and hence not highly monochromatic, through characters 12 and gratings 13, respectively. The paths of light are represented by dotted lines.

Light emanating from disc 10, whether passing through characters 12 or gratings 13, is reflected by the mirror 20 of a mirror galvanometer 21 and focused by a lens 22 to impinge upon a light sensitive recording medium 23. This medium may comprise photographic film, or it may comprise photoconductive thermoplastic film having a structure such as shown and described in the aforementioned U.S. Pat. No. 3,291,601 to J. Gaynor. The process for recording images on photoconductive thermoplastic films, described in the Gaynor patent, requires that film 23 be electrically charged prior to impingement of the light image thereon and that the film be heated subsequent to impingement of the image thereon in order to deform in accordance with the image pattern. Although apparatus for electrically charging the film prior to exposure to light images and apparatus for heating the film subsequent to exposure to light images are not shown in FIG. 1, those skilled in the art will appreciate that an electrical charging station is employed ahead of the location at which the film is exposed to light images and that a heating station is employed beyond the location at which the film is exposed to light images. The film is heated sufficiently at the heating station to allow it to deform, and is cooled when it travels beyond the heating station. Film 23 is driven by a film drive stepper motor 24 which may rotate sprocket wheels 25 in stepwise fashion in order to advance the film incrementally.

A sensor 30 which detects the angular position of disc 10 facilitates synchronization of flash lamp 16, disc 10, galvanometer 21 and film 23. Sensor 30 may be a magnetic pickup which detects magnetic strips 17 spaced around the periphery of disc 10; alternatively, sensor 30 may be a photodetector and strips 17 may be optically reflective or, if disc 10 is reflective, nonreflective strips. With each output signal from detector 30 produced each time one of strips 17 passes the detector, an electronic digital counter 31 is correspondingly advanced. Counter 31 is reset to zero each time a photodetector or photocell 32 receives light energy from a constantly lit lamp 33 through a hole in disc 10 situated in a location marking the start of passage of a complete series of characters or symbols through a path between mirror 20 and mirror 14 or 15. Output signals from counter 31, indicative of the count therein, are supplied from the counter stages in parallel to a first input of a coincidence detector circuit 35, which produces a steady output signal during the entire interval in which counts supplied to both inputs thereof are identical.

Figure 5:
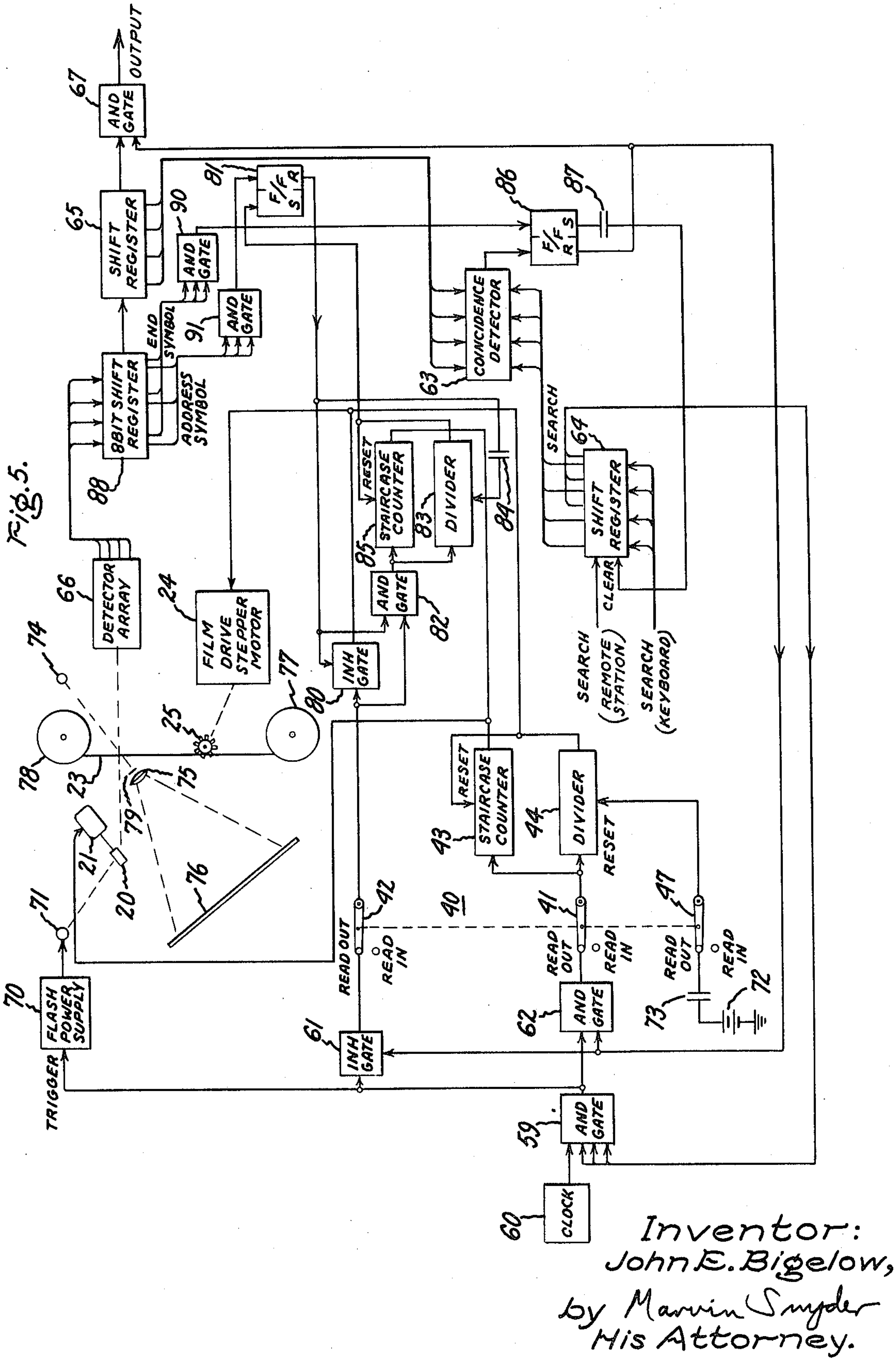
FIG. 5 is a schematic diagram of apparatus employed for reading data out of storage from the system of the instant invention.

Input signals to the second input of coincidence detector 35 are furnished from the stages of a shift register 36 in parallel. Shift register 36 receives input signals serially over a communications line, typically from a remote station, or in parallel, as from an electrical keyboard. Output signals from coincidence detector 35 are furnished through a blocking capacitor 37 in order to assure that but a single pulse is produced when the output codes produced by digital counter 31 and shift register 36 are identical. This single pulse clears shift register 36 and comprises the trigger pulse for actuating flash lamp power supply 38 which causes flash lamp 16 to emit a single burst of light. The single pulse is also conducted through a read in terminal and one contact 41 of a 2-position ganged switch 40 to the input of a digital-to-analogue converter such as a staircase counter 43, also known as a staircase generator, and to the input of a digital divider circuit 44 which may be an *n*-stage ring counter wherein (*n*-1) constitutes the divisor. Staircase counter 43 produces a steady-state output signal which increases in amplitude by a fixed increment each time it receives an input pulse, and is reset to zero output amplitude each time a reset pulse is received from divider circuit 44. Divider 44 additionally drives film drive stepper motor 24 by advancing the stepper motor one increment with each output pulse. The output of divider 44, moreover, is furnished to a second contact 42 of ganged switch 40 which, when the switch is in the read in position, remains unconnected electrically. Mirror galvanometer 21 is driven by the output signal of staircase counter 43, so that the position of galvanometer 21 is incrementally changed in accordance with the incremental changes in output amplitude of the staircase counter. Thus, as the galvanometer is advanced incrementally in the rotational direction indicated by the curved arrow, the images impinging upon film 23 advance in the direction indicated by the two arrows above the film. Apparatus connected to the read out terminals of switch 40 is shown in FIG. 5.

In FIG. 1, shift register 36 is wired so that, upon receipt of a line feed symbol, output signals from the stages of the shift register which are energized fulfill the requisite number of inputs to an AND gate 45. A line feed pulse is then applied through the read in terminal of the third switch contact 47 of ganged switch 40 to film drive stepper motor 24, advancing the motor by a single increment. In addition, staircase counter 43 is reset to zero output voltage amplitude and the ring counter employed as divider 44 is reset to its first count condition by the output pulse from AND gate 45.

Figure 2:
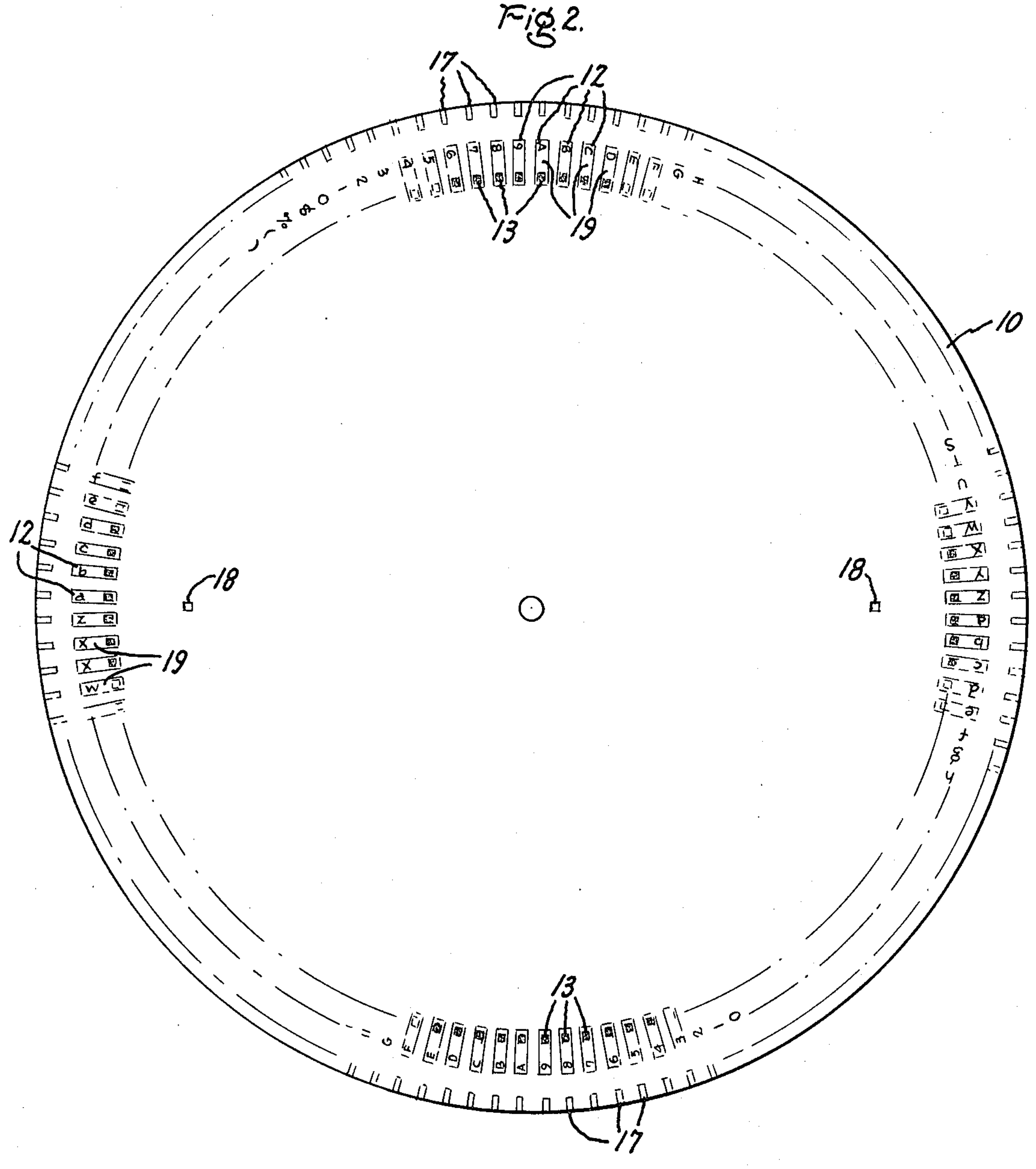
FIG. 2 is a plan view of the rotating disc on which unique sets of gratings are situated for diffracting light onto optical recording means.
Figure 3:
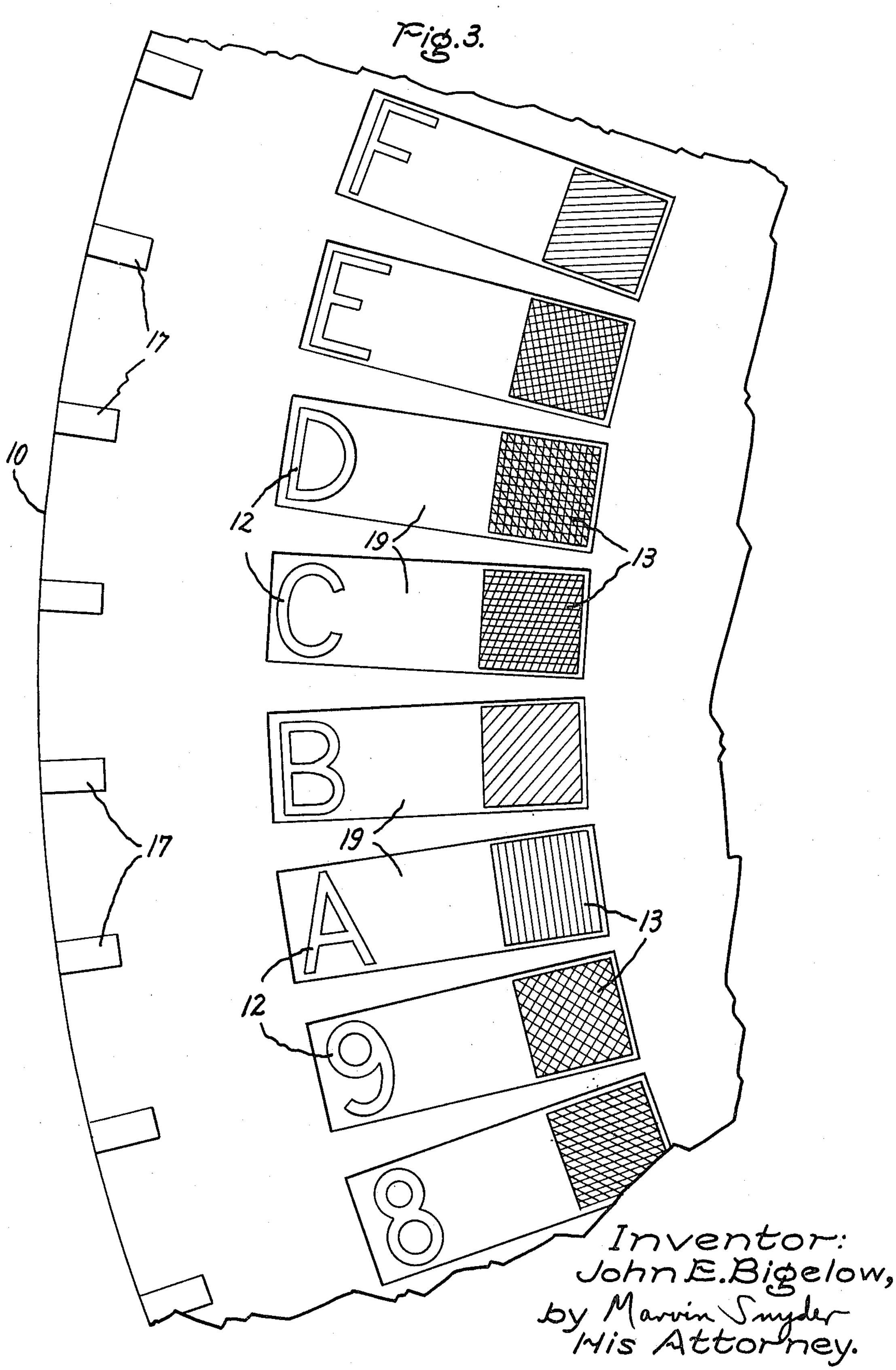
FIG. 3 is a plan view of a greatly enlarged portion of the disc shown in FIG. 2.

Before considering operation of the circuit of FIG. 1, the details of disc 10 as illustrated in FIGS. 2 and 3 should be considered. Thus, in FIG. 2, disc 10 is shown to contain 250 radial positions, although not to scale, and the relationship between strips 17 and transparencies 19 which contain characters 12 and gratings 13 shows that, for each radial position, one of each of strips 17 and transparencies 19 is in radial alignment. Moreover, the characters and their respective associated gratings are arranged around the disc in two identical sequences so that, at any two diametrically opposed positions on the disc, the characters are identical and their respective associated gratings are of identical configurations. This allows the disc to make but one-half revolution in order for the read in apparatus to view one entire sequence of characters and gratings. In addition, a pair of apertures 18 closer to the center of the disc than transparencies 19 are shown. These apertures are situated in separate radii on a diameter of the disc equidistant from the center and in alignment with the space separating what is to be considered the first and last character of one entire sequence of characters.

In FIG. 3, a segment of disc 10 is shown, greatly enlarged although not to scale, in order to illustrate the superimposed optical diffraction gratings 13 recorded on transparencies 19. Thus, for example, the letter A is illustrated by a single grating of lines oriented vertically (i.e. tangent to a circumference), which arbitrarily may be termed a 0° orientation, while the letter B is illustrated by a single grating also, but oriented at 45°. As further examples, the letter C is illustrated by two gratings superimposed, one grating oriented at 22½° and the second grating oriented at 90°, while the letter D is illustrated by three superimposed gratings oriented at 0°, 90° and 135°. The same type of representation is utilized for characters other than the upper case letters; for example, the numeral 9 is illustrated by two superimposed gratings oriented at 45° and 135°. It is clear that by using gratings separated by angles of 22½°, or whole number multiples thereof, up to eight different gratings may be superimposed on a transparency. Thus, the number of combinations possible is 256, which is sufficient to permit utilization of a sequence of 125 different characters as shown on disc 10.

Reading in of data, as accomplished by the apparatus of FIG. 1 when 2-position switch 40 is in the read in position, does not begin until an input signal has been received by shift register 36. Until such time, no signal is applied to coincidence detector 35 from the shift register, so that the coincidence detector produces no output signal, even though digital counter 31 is continually counting from 0 to 125 and being reset to zero twice during each revolution of disc 10. Because no output signals are produced by coincidence detector 35 at this time, flash lamp 16 remains untriggered and both galvanometer 21 and film drive stepper motor 24 remain at rest, despite the fact that motor 11 continues to drive disc 10 at a fixed speed.

When shift register 36 receives an input signal comprising enough bits to represent one character, as may be determined, for example, by presence of a "tag" bit or ONE in the final stage of the shift register, or the stage farthest from the stage to which serial input signals are first supplied, and regardless of whether the signal has been applied to the shift register stages in series from a remote station through the communications line, or in parallel from a keyboard, the condition of the shift register stages is immediately communicated, in parallel, from the shift register to coincidence detector 35. This condition or count remains applied to the coincidence detector until digital counter 31 reaches the same condition or count. At this time, an output signal is produced by coincidence detector 35 in the form of a steady state signal; however, due to the presence of blocking capacitor 37, only a single pulse is furnished through the capacitor. This pulse clears all data out of shift register 36 and, in addition, causes flash lamp 16 to trigger, thereby imaging the called-for character 12 from mirror 14 through disc 10 onto photoconductive thermoplastic film 23. Simultaneously, the diffraction gratings 13, which on disc 10 are diametrically opposite the character being imaged onto film 23 and hence correspond to this character, are imaged onto film 23 by light reflected from mirror 15. As previously described, photoconductive thermoplastic film 23 at this location contains an electrical charge at room temperature, and impingement of light thereon selectively discharges the film in accordance with the pattern of the light image, as described in the aforementioned U.S. Pat. No. 3,291,601 to Gaynor.

The output pulse from coincidence detector 35 advances staircase counter 43 by a single increment, increasing the amplitude of its output voltage by a single increment. This causes mirror galvanometer 21 to rotate mirror 20 slightly in the direction of the arrow, but by a predetermined discrete amount, so that the next character and its associated diffraction gratings can each be imaged on a new region respectively of film 23 in the direction of the two arrows above the surface of the film. The output pulse produced by coincidence detector 35 is also furnished to divider circuit 44, advancing the count of the divider circuit by one. However, since the divider circuit begins its count at zero, it does not produce an output signal at this time; hence, film drive stepper motor 24 remains at rest.

Thus, with shift register 36 in the clear condition, counter 31 continuing to count, and galvanometer mirror 20 rotationally advanced by one increment, the next signal comprising enough bits to represent a character received by shift register 36 is applied immediately to coincidence detector 35 to await coincidence with the output signal from digital counter 31. When coincidence is detected, flash lamp 16 again flashes, and another character together with its associated diffraction gratings are imaged onto the virgin sections of film 23 by mirror 20 of galvanometer 21 alongside the previous character and its associated diffraction gratings respectively. As previously described, staircase counter 43 advances by another increment so as to shift mirror 20 of galvanometer 21 by another angular increment. Similarly, divider 44 advances by one more count and shift register 36 is cleared. When the next character is received, the entire operation is again repeated for this next character and its associated diffraction gratings, which are thereupon imaged onto film 23 alongside the previously imaged character and its associated diffraction gratings respectively.

The foregoing recording procedure continues until a sufficient number of characters and their associated diffraction gratings have been recorded along a single line normal to the direction of travel of film 23 when driven by stepper motor 24. At this time, divider 44 reaches its maximum count ($n$-1) and produces a single output pulse, resetting staircase counter 43 to zero and advancing film drive stepper motor 24 by a single increment so as to advance film 23 by a single increment. In addition, since divider 44 is typically a ring counter which produces an output pulse only when its final stage is energized, the divider resets itself by deenergizing its final stage and energizing its initial stage in typical ring counter fashion. At this time, mirror 20 returns to its original position, or starting point, due to the drop in output voltage of staircase counter 43 from its maximum value to zero. Another entire line may thereupon be recorded upon film 23.

As film 23 is advanced by stepper motor 24, assuming that the film comprises photoconductive thermoplastic film of the type described in the aforementioned J. Gaynor Patent, the portion thereof on which light images have impinged so as to selectively discharge the electrical charge contained thereon reaches a heating station. At the heating station the film is warmed to a temperature sufficient to allow the thermoplastic material thereof to deform in accordance with the charges thereon. As the film continues to advance, the warmed regions pass beyond the heating station, thus returning to room temperature and solidifying. This renders the deformation patterns on the film permanent or nonvolatile, since the film is not thereafter heated unless it is desired to intentionally erase the recorded deformation patterns.

Because it is desirable to provide capability for recording a large number of characters and their associated diffraction gratings in each line across film 23, such as 76 characters along one-half the width of the film and 76 diffraction gratings along the adjacent half of the film, with each line being normal to the direction of travel of film 23 as driven by motor 24, AND gate 45 provides a line feed signal so as to increase the speed at which data may be recorded by obviating need for mirror 20 to scan across an entire line on the film if less than the maximum number of characters per line are to be recorded on any line. Consequently, receipt by shift register 36 of a line feed character, which is binary coded to avoid the possibility of coincidence with the condition of digital counter 31, causes immediate application of a signal through prewiring of the affected stages of the shift register, in parallel, to the inputs of AND gate 45. When all the inputs of AND gate 45 are thus fulfilled, an output pulse supplied through switch contact 47 produces a pulse on the output line of divider 44 which advances stepper motor 24 by a single step and resets both staircase counter 43 and divider 44 to zero. In absence of this connection through switch contact 47, a series of repeated space symbols may be transmitted to shift register 36 until divider 44 has counted to its maximum ($n$-1), such as 76, resetting staircase counter 43 and advancing film drive stepper motor 24 by a single increment. However, a recorded address line may contain but a small group of characters, such as 5, with the associated recorded data beginning on the next line. In such instance, as well as when the final line of recorded data contains less than ($n$-1) or 76 characters, the connection through switch contact 47 is useful.

Figure 4:
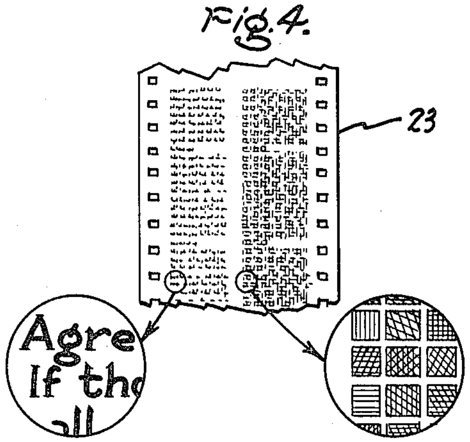
FIG. 4 is a plan view of optical recording means employed in the system of the invention, with portions of the recording means shown separately and greatly enlarged.

FIG. 4 is a plan view of a segment of photoconductive thermoplastic film 23, showing the film after it has been developed by heating and subsequent cooling following recording thereon with the read in apparatus of FIG. 1. Data are recorded on the film in two columns, with the left column containing rows of characters and the right column containing their associated rows of diffraction gratings. This can be seen from the enlarged encircled portions of part of each column on the film.

Each block of data recorded on the film is headed by a row of only a few address symbols; moreover, the block of data may end with a less than full row, with the very next row comprising the address symbols for the next block of recorded data. Accordingly, the utility of the line feed signal furnished through switch contact 47, shown in FIG. 1, can be appreciated.

FIG. 5 shows the read out portion of the system of the instant invention, with switch 40 now being in the read out position and the apparatus connected to the read in terminals, as shown in FIG. 1, being omitted. Some of the other apparatus employed in the read in operation is also employed in the read out operation in the interest of achieving economy of apparatus. Those skilled in the art, however, will recognize that two entirely separate combinations of apparatus may be employed in the system, especially where capability of simultaneous read in and read out is desired. Such duplex capability is to be found in a system wherein a plurality of reels of film comprise the storage medium so that one of the reels of film may be read out while a different reel of film is having data recorded thereon.

The readout system functions by first searching for an address and then, once the address is found, by reading out all data associated with that address. Thus, in the circuit of FIG. 5, a clock pulse generator 60 is connected to provide output pulses to one input of an AND gate 59, the remaining inputs of which are fulfilled, in parallel, from predetermined stages of a shift register 64 prewired to produce output signals immediately upon receipt of a search symbol preceding an address which is to be sought. The output of AND gate 59, when all inputs thereof are fulfilled, furnishes clock pulses to the input of an INHIBIT gate 61, which is nonconductive in the presence of an input signal received from a flip-flop circuit 86, and triggers a flash lamp power supply 70 for a xenon flash lamp 71. AND gate 59 also provides output pulses to one input of a 2-input AND gate 62, the second input of which is energized together with the gating input of INHIBIT gate 61 from the reset output, symbolized by R, of a flip-flop circuit 86 in accordance with the condition of a coincidence detector 63. For a readout rate of 250 characters per second, clock pulse generator 60 conveniently operates at a repetition rate of 250 pulses per second.

Coincidence detector 63 receives input signals at each one of its two inputs from each one of a pair of shift registers 64 and 65, respectively. Shift registers 64 and 65, which contain a number of stages equal to a whole number multiple of 8, such as 5, so as to be able to accommodate an entire address word therein at once, are each connected to produce output signals in parallel from each of their stages respectively, in order to permit immediate comparison of the signals stored therein by coincidence detector 63. Input pulses are received by the stages of shift register 64 in serial fashion from electronic pulse-producing apparatus, typically situated at a remote station, or in parallel from a keyboard. Similarly, shift register 65 receives input signals in serial fashion, at a pulse repetition rate which is at least eight times the character readout rate, from an eight bit shift register 88 receiving input signals at its stages in parallel from an array of optical detector means 66, typically comprising an array of photodetectors. Shift register 65 fulfills one input to a 2-input AND gate 67 with signals furnished from its stages in serial fashion. The second input to a 2-input AND gate 67 is fulfilled by output signals from flip-flop circuit 86, when in the reset condition. Coincidence detector 63, which produces a steady-state output signal whenever the input signals supplied thereto are in coincidence, drives flip-flop circuit 86 into the reset condition. On the other hand, the set condition of flip-flop circuit 86, symbolized by S, is produced by output signals from an AND gate 90 having its inputs prewired in parallel from predetermined stages of shift register 88 in order to detect an "end" symbol indicative of the end of a single message. This results in production of a single pulse through blocking capacitor 87 which drives shift register 64 into the clear condition.

With 2-position 3-contact switch 40 in the readout condition, output signals from AND gate 62 are connected to drive both staircase counter 43 and divider 44 in parallel through switch contact 41, while output signals from INHIBIT gate 61 are supplied through switch contact 42 to the input of an INHIBIT gate 80, the output of which is connected to energize film drive stepper motor 24. The output of INHIBIT gate 61 is also furnished to one input of a 2-input AND gate 82, the second input of which is energized in parallel with the gating input of INHIBIT gate 80 from a flip-flop circuit 81 when in the reset condition. Flip-flop circuit 81 is driven into the reset condition by output signals from an AND gate 91 which has its inputs respectively prewired to predetermined stages of eight bit shift register 88 so as to provide an output signal in response to a unique symbol recorded on film 23 immediately ahead of each address word, indicative of having located an address. Similarly, flip-flop circuit 81 is driven into the set condition by output signals from a divider circuit 83 which counts up to a number equal to the number of characters in an address word as each character in the address word is detected. Thus, divider circuit 83 provides an output signal immediately following each complete address, indicative of having completed detection of an entire address word on film 23.

Output signals from AND gate 82 are furnished, in parallel, to the inputs of divider circuit 83 and a staircase counter 85. Staircase counter 85 is connected to drive mirror galvanometer 21 so as to control the position of mirror 20 which deflects light produced from flash lamp 71 through film 23 onto the face of detector array 66, and is reset with each output pulse produced by divider circuit 83. The divider circuit itself is reset through a blocking capacitor 84 by flip-flop circuit 81 each time the flip-flop circuit is reset. The divisor introduced by divider circuit 83 is smaller than that of divider circuit 44, being equal only to the number of characters recorded in any complete address word. Momentary reset signals from a DC power supply 72 are furnished to divider circuit 44 through a blocking capacitor 73 each time switch contact 47 is actuated to the readout position.

Each output signal from divider circuit 44 drives film drive stepper motor 24, which in turn drives sprocket wheel 25 to transport film 23, and resets staircase counter 43. Staircase counter 43 similarly drives mirror galvanometer 21 in the manner described for staircase counter 85 so as to control the position of mirror 20. For display and monitoring purposes, a lamp 74 may be used to radiate light through film 23 and a focusing lens 75, which is preceded by a stop 79, onto a projection screen 76. This allows viewing of the entire line on film 23 being read out by the system while mirror 20 is deflecting light from flash lamp 71 across film 23. A takeup reel 77 and a payout reel 78 are used for transporting film 23 as controlled by sprocket wheel 25; however, in order to maintain tension on film 23, takeup reel 77 is preferably driven by a motor with an overrunning clutch, while payout reel 78 is damped to maintain a constant drag on the film.

In operation, switch 40 is in the read out position, thereby preventing staircase counter 43 and divider circuit 44 from being driven by read in signals from coincidence detector 35, shift register 36 and digital counter 31 of the read in apparatus shown in FIG. 1. At this time, flip-flop circuit 86 is in the set condition so that the second input to 2-input AND gate 62 is not fulfilled, and all but the first input to AND gate 59 are unfulfilled so that clock pulses from clock pulse generator 60 cannot be received by INHIBIT gate 61 and AND gate 62. Divider 44 is in its reset or zero condition, so that galvanometer 20 is similarly in its lowest or zero position and film drive stepper motor 24 is at rest.

When an address signal is received by the stages of shift register 64 either serially from electronic apparatus, such as may be situated at a remote station, or in parallel from a keyboard, a signal indicative of a search is furnished, in parallel fashion, from predetermined stages of shift register 64 to the second input of AND gate 59, permitting passage of clock pulses through the AND gate. This search signal comprises a unique binary code to precede any address word to be searched, and is different from the code for any of the recorded characters. The address word in shift register 64 is then immediately compared by coincidence detector 63 with the output signal of shift register 65 and, until coincidence is detected between the data in shift registers 64 and 65, no output signal is produced by coincidence detector 63. Hence, one of the two inputs to 2-input AND gate 62 remains unfulfilled, as does the gating terminal to INHIBIT gate 61. INHIBIT gate 61 is thus uninhibited, passing clock pulses from AND gate 59 to film drive stepper motor 24 through INHIBIT gate 80 which is uninhibited due to flip-flop circuit 81 being in the set condition as the result of previous receipt of a signal from divider circuit 83 following completion of the most recent address word. Accordingly, film 23 is driven at a high rate of speed, advancing one increment for each pulse from clock pulse generator 60, while flash lamp 71 is triggered by each clock pulse received through AND gate 59.

When the address symbol used in the system to precede the first character of every address word is detected by AND gate 91 upon detection of the unique combination of superimposed diffraction gratings corresponding to the address symbol by detector array 66, flip-flop circuit 81 is driven into its reset condition, inhibiting gate 80 but fulfilling one of the two inputs to 2-input AND gate 82 and resetting divider 83 to zero with a pulse through capacitor 84. Prior to occurrence of the next clock pulse, the address symbol supplied to shift register 88 from detector array 66, and which entirely fills shift register 88, is transferred serially from shift register 88 to shift register 65. Thereafter, each clock pulse received from INHIBIT gate 61 fulfills the second input of AND gate 82 so as to energize staircase counter 85 and divider 83 in parallel. However, operation of film drive stepper motor 24 is halted due to interruption of the pulses formerly received through INHIBIT gate 80.

As amplitude of output voltage from staircase counter 85 increases by each increment, the angular position of mirror 20 of mirror galvanometer 21 advances by a corresponding increment after each operation of flash lamp 71, until the entire address word, detected by detector array 66, has been transferred serially into shift register 65 from shift register 88. At this time, divider 83, which is set to count a number of pulses equal to the number of characters in an address word, such as 5 for example, resets staircase counter 85 to zero and thereby returns mirror galvanometer 21 to its starting position. Also at this time, flip-flop circuit 81 is driven back into its set condition by divider 83, so as to again permit INHIBIT gate 80 to pass clock pulses received from INHIBIT gate 61. If at this time there is no coincidence between addresses applied from shift registers 64 and 65 to coincidence detector 63, motor 24 again rapidly advances film 23 until the next address symbol is detected by shift register 88 and the address word associated therewith is examined in the same manner as previously described.

Upon detection of coincidence between the addresses in shift registers 64 and 65, coincidence detector 63 produces a steady output signal, resetting flip-flop circuit 86. The second input to 2-input AND gate 67 is thus fulfilled, rendering the AND gate conductive to output signals supplied serially from shift register 65, while INHIBIT gate 61 is inhibited and the second input to AND gate 62 is fulfilled. Accordingly, clock pulses received by the first input of AND gate 62 through AND gate 59 are now supplied through switch contact 41 to the inputs of staircase counter 43 and divider 44. The amplitude of output voltage produced by staircase counter 43 increases incrementally with each clock pulse received from AND gate 62, so that mirror 20 of galvanometer 21 is advanced incrementally along a line normal to the direction of travel of film 23 after flash lamp 71 has been triggered by the clock pulse from AND gate 59 to image the symbol recorded on film 23 onto the face of detector array 66. The symbols thus detected by array 66 are furnished to eight bit shift register 88 in parallel and, prior to occurrence of the next clock pulse, are shifted serially into shift register 65. The symbols in shift register 65 are thence shifted out serially, at a rate of eight bits per clock pulse, through AND gate 67 to a communications line which may be connected to information processing or printing apparatus, situated either locally or at one or more remote stations. These signals may also be furnished, if desired, to a plurality of AND gates (not shown) from the respective stages of shift register 65 in parallel, so as to energize an electrical printer with the output signals from the shift register. Of course, once the address has been shifted out of shift register 65, coincidence is no longer detected by coincidence detector 63 so that the reset input of flip-flop circuit 86 is now deenergized.

When an entire line on film 23 has been read out, divider circuit 44 advances film drive stepper motor 24 by a single increment to bring the next recorded line into alignment with mirror 20 and detector array 66. Simultaneously, divider circuit 44 resets staircase counter 43 to zero, thereby returning mirror galvanometer 21 to its initial position. Readout of this next line on the film then takes place in the manner previously described. In this fashion, film 23 is read out, line-by-line, until the final line has been reached.

When the final character of the data to be read out has been reached, the next recorded symbol, which follows immediately thereafter, represents a unique final or end symbol, and is the same for each group of data recorded on the film. This final symbol is supplied in parallel from prewired stages of shift register 88 to the inputs of AND gate 90 and returns flip-flop circuit 86 to its set condition, thereby supplying a pulse through capacitor 87 to shift register 64. The pulse supplied through capacitor 87 clears shift register 65, insuring that the system will not again search for the previously called-for address by halting application of that address to coincidence detector 63. Thus, all but the first input to AND gate 59 are unfulfilled, and the system, with the exception of clock pulse generator 60, remains at rest awaiting receipt of the next address to be searched.

As each line recorded on film 23 is aligned in front of the face of detector array 66, the characters printed on that line may be monitored on screen 76, which may conveniently be a rear-projection type of screen. For photoconductive thermoplastic film of the type described in the aforementioned Gaynor patent, light source 74, together with stop 79 and lens 75, are included as part of a Schlieren optics type of projection system, which is well known in the art. This projection system converts the phase modulated images, recorded on film 23, to visible amplitude modulated images on screen 76.

Figures 6, 7:
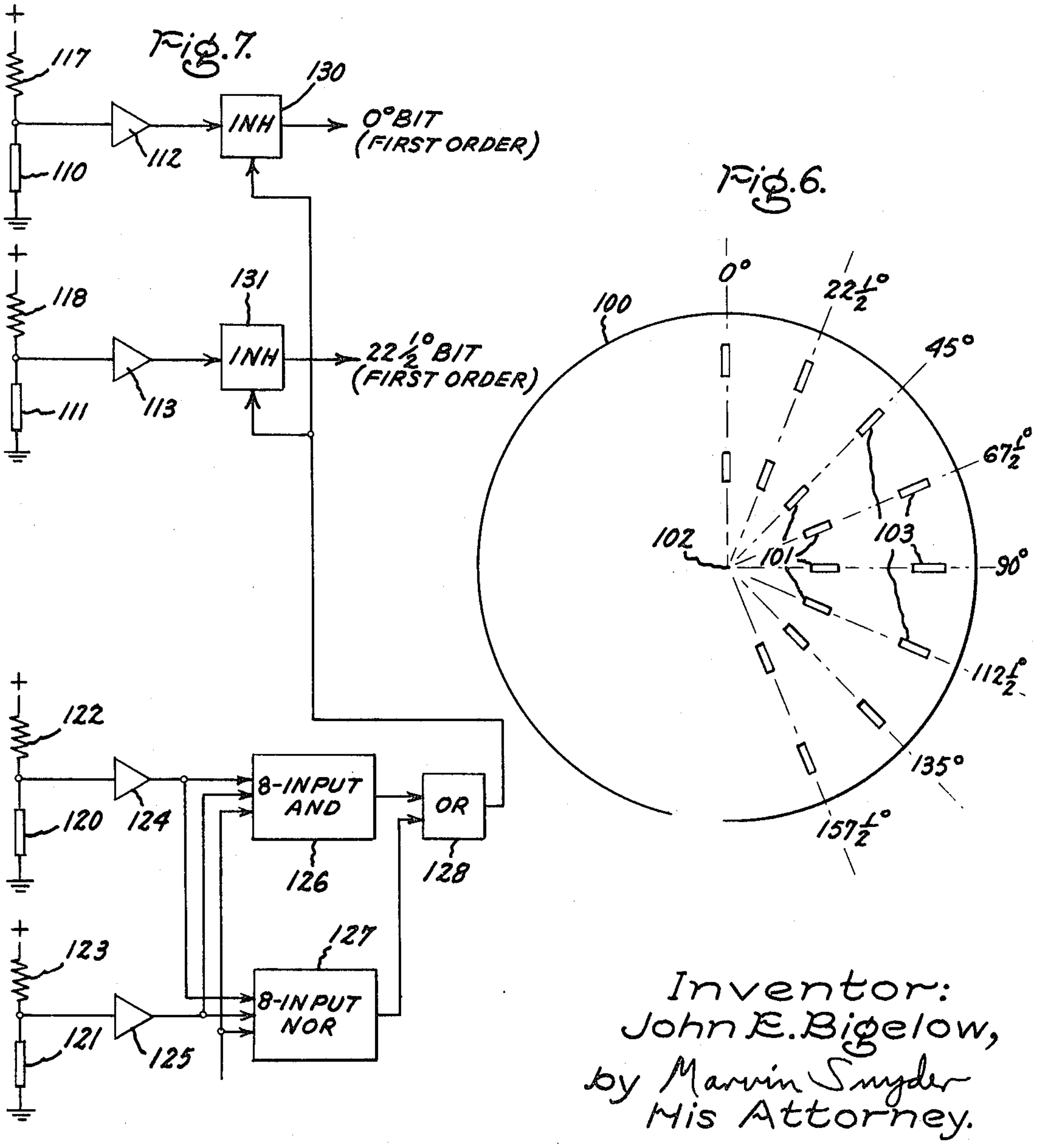
FIG. 6 is a plan view of the light-receiving face of the detector array which senses light diffracted from recording gratings during read out operations.
FIG. 7 is a schematic diagram of circuits utilized in the detector array to obviate erroneous detector indications.

FIG. 6 is an end view of face 100 of detector array 66 shown in FIG. 5. This face is opaque, except for 16 slots therein. Eight slots 101 are positioned at equal radii from the center 102 around the face at 22½° separations in a sector bounded by angles of 0° and 157½° for the purpose of admitting first order images diffracted by the gratings recorded on film 23 of FIG. 6 to the detectors of the detector array. Eight additional slots 103 are likewise positioned at equal radii from the center 102 around the face. The radial distance from each of slots 103 to the center is twice that from each of slots 102 to the center, in order to permit response to the second order image for each grating. Detection of the second order images is used to eliminate detection ambiguities since loss of diffracted light is recognized by absence of all second order images, even if extraneous light should, at that time, illuminate one or more of slots 103, while presence of extraneous light is recognized by presence of all second order images. When either of these ambiguity conditions is thus recognized, no output signals are furnished by the apparatus of detector array 66.

Behind each of radial slots 101 and 103 in surface 100 is situated a photodetector. Accordingly, each of these photodetectors is responsive only to light diffracted to a position aligned with the radial position of its respectively associated slot. As a result, light diffracted, for example, by a horizontally oriented diffraction grating is diffracted vertically into the slots in the 0° position. Similarly, light diffracted by a vertically oriented diffraction grating is diffracted horizontally into the slots in the 90° position, etc. It should be noted that while each of the photodetectors behind the radially arranged slots comprises a detector for a different one of eight possible bits for both first and second order images, a higher density of bits may be detected by positioning the radial slots along radii separated by less than 22½° so as to accommodate additional first and second order radial slots together with a corresponding photodetector situated behind each of the additional radial slots. In the alternative, if the spacing between lines in the diffraction gratings is made variable, additional data storage and retrieval capability can be obtained with the same number, or even less, of angular orientations for the gratings.

FIG. 7 is a schematic diagram of one way in which the apparatus of detector array 66 of FIG. 5 may be interconnected. Thus, a pair of photocells 110 and 111, representing the photocells behind the 0° and 22½° first order image responsive slots 101 respectively of FIG. 6 are connected to receive positive bias through biasing resistances 117 and 118 respectively, and to supply input signals to amplifiers 112 and 113 respectively. Accordingly, amplifiers 112 and 113 produce output signals indicative of presence or absence of the 0° and 22½° bits respectively. A pair of additional photocells 120 and 121, situated behind the 0° and 22½° second order image responsive slots 103 respectively of FIG. 6, receive positive bias through biasing resistances 122 and 123 respectively, and furnish input signals to amplifiers 124 and 125, respectively. Each of amplifiers 124 and 125 furnishes one input signal respectively to an 8-input AND gate 126 and an 8-input NOR gate 127. Thus, each of AND gate 126 and NOR gate 127 is energized in accordance with the second order images falling on face 100, shown in FIG. 6. A 2-input OR gate 128 is connected to receive output signals from each of AND gate 126 and NOR gate 127.

A pair of INHIBIT gates 130 and 131 are provided, each of which has its signal input fulfilled by output signals of amplifiers 112 and 113, respectively. The control or gating input to each of INHIBIT gates 130 and 131 is energized, in common, from the output of OR gate 138. When the control input to each of the INHIBIT gates is energized, output signals from amplifiers 112 and 113 are prevented from being coupled out of detector array 66, shown in FIG. 5. Although but two photocells behind each group of radial slots 101 and 103 are shown for simplicity, the photocells behind the remaining radial slots of face 100 are interconnected in a similar manner and therefore are not shown.

In order for photocells 110 and 111 to be capable of furnishing output signals to utilization apparatus, the control input to each of INHIBIT gates 130 and 131 must not be energized by output signals from amplifier 122. Thus, unless light impinges on at least one but less than all of the photocells behind slots 103, none of the photocells behind slots 101 can furnish output signals to utilization apparatus. This prevents operation during malfunctions since if none of the second order image slots is illuminated, as may occur if extraneous light falls on the first order image slots only, NOR gate 127 open-circuits INHIBIT gates 130 and 131 through OR gate 128. Similarly, if all of the second order image slots are illuminated, as may occur if extraneous light falls on the entire face 100 of detector array 66, AND gate 126 open-circuits INHIBIT gates 130 and 131 through OR gate 128. Thus, detector array 66 is prevented from producing any output signals in absence of detection of valid second order images by the array.

The foregoing describes a simple, rapid access, optical data storage and retrieval system capable of high-speed operation, wherein high density storage of discrete data in digital form is achieved optically without requiring highly monochromatic light sources. Characters of data to be stored and read out are unambiguously identified by recognizing superimposed optical gratings of predetermined angular orientation uniquely associated with each of the respective characters.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A method for storing data and retrieving selected portions of said stored data comprising:
   - recording a first plurality of sets of superimposed optical diffraction gratings of predetermined angular orientations, each set of gratings representing an address character to be stored;
   - recording a second plurality of sets of superimposed optical diffraction gratings of predetermined angular orientations in association with said first plurality of sets of superimposed optical diffraction gratings, each set of gratings of said second plurality representing a data character to be stored;
   - sensing the angular orientation of diffracted light associated with each one of said first plurality of sets of superimposed diffraction gratings so as to recognize a desired address; and
   - sensing the angular orientation of diffracted light associated with each one of the second plurality of sets of superimposed diffraction gratings associated with said first plurality so as to recognize each one of the stored data characters.

2. The method of claim 1 including the step of producing a binary digital manifestation of the presence of each possible grating in each set of superimposed gratings which is sensed.

3. The method of claim 1 wherein the steps of recording first and second sets of superimposed optical diffraction gratings comprises charging a photoconductive thermoplastic recording medium, imaging desired sets of superimposed diffraction gratings on said medium, and cycling said medium through a temperature increase above a predetermined level to allow said medium to deform in accordance with the patterns of gratings imaged thereon.

4. The method of claim 3 including the step of producing a binary digital manifestation of the presence of each possible grating in each set of superimposed gratings which is sensed.

5. The method of claim 1 wherein the step of sensing the angular orientation of diffracted light associated with each one of said first plurality of sets of superimposed diffraction gratings so as to recognize a desired address comprises storing a binary digital manifestation of said desired address, producing a binary digital manifestation of the presence of each possible grating in each set of superimposed gratings of an address word, comparing the stored binary digital manifestation with the produced binary digital manifestation, and destroying the stored binary digital manifestation when coincidence with the produced binary digital manifestation has been detected.

6. A method for storing data and retrieving selected portions of said stored data comprising:

recording according to a predetermined pattern a plurality of sets of superimposed optical diffraction gratings of predetermined angular orientations, each set of gratings representing data to be stored;

sensing the angular orientation of diffracted light associated with predetermined ones of said sets of superimposed optical diffraction gratings so as to recognize a predetermined pattern of data; and sensing according to said predetermined pattern the angular orientation of diffracted light associated with additional ones of said sets of superimposed optical diffraction gratings after said predetermined pattern of data has been recognized.

7. The method of claim 6 including the step of producing a binary digital manifestation of the gratings present in each set of superimposed optical gratings which is sensed.

8. The method of claim 6 wherein the step of recording a plurality of sets of superimposed optical diffraction gratings comprises charging a photoconductive thermoplastic recording medium, imaging said sets of superimposed optical diffraction gratings on said medium, and cycling said medium through a temperature increase above a predetermined level to allow said medium to deform in accordance with the patterns of gratings imaged thereon.

9. The method of claim 8 including the step of producing a binary digital manifestation of the presence of each possible grating in each set of superimposed optical gratings which is sensed.

10. A system for storing data and retrieving desired portions of said stored data comprising:

recording means for recording patterns corresponding to patterns imposed thereon;

a plurality of unique sets of superimposed diffraction gratings, said unique sets being distinguishable from each other by comprising diffraction gratings having different angular orientations in the plane containing said gratings;

input means for imposing selected ones of said unique sets of superimposed diffraction gratings onto separate regions, respectively, of said recording means; and transducer means responsive to light emanating from each one of said superimposed diffraction gratings in each selected set of gratings recorded on said recording means so as to produce an electrical signal corresponding to each of the selected sets of gratings recorded on said recording means.

11. The system of claim 10 wherein said recording means comprises a photoconductive thermoplastic medium.

12. The system of claim 10 wherein said input means comprises a disc, said disc containing said plurality of unique sets of superimposed diffraction gratings, and means for directing a burst of light from a selected set of gratings onto said recording means.

13. The system of claim 12 including motor means drivably coupled to said disc, and means responsive to the angular position of said disc for initiating said burst of light when said disc is in a predetermined angular position.

14. The system of claim 13 wherein said recording means comprises a photoconductive thermoplastic medium.

15. The system of claim 10 wherein said transducer means comprises an array of photodetectors, each photodetector of said array being situated with respect to said recording means so as to detect first order images of said diffraction gratings recorded on said recording means.

16. The system of claim 15 including temporary storage means, means coupling each photodetector of said array in parallel to said storage means, and means coupled to said temporary storage means for producing signals compatible with visible character producing means.

17. The system of claim 15 wherein said array includes additional photodetectors situated with respect to said recording means so as to detect second order images of said diffraction gratings recorded on said recording means, and logic circuit means coupling said additional photodetectors to the remaining photodetectors of said array in order to ensure validity of output signals produced by said remaining photodetectors.

18. The system of claim 15 including means for directing a separate burst of light from each one of separate adjacent locations respectively on said recording means in sequence, first temporary storage means, means coupling each photodetector of said array to said first temporary storage means, and second temporary storage means coupled to said first temporary storage means for producing signals compatible with visible character producing means, said first temporary storage means transferring all data applied thereto from said array of photodetectors to said second temporary storage means between occurence of the separate bursts of light received in succession from each separate adjacent location on said recording means.

19. The system of claim 10 including means for scanning discrete bursts of light energy in predetermined orderly patterns across said recording means.

20. The system of claim 10 including mechanical means for transporting said recording means in discrete increments, means for controllably directing bursts of light onto said recording means, and means for controlling said mechanical means to transport said recording means by one discrete increment after occurrence of a predetermined number of said bursts of light.

21. A system for storing data in the form of alphanumeric characters and retrieving desired groups of said stored alphanumeric characters comprising:

light sensitive recording means for recording patterns corresponding to patterns of light imaged thereon;

a plurality of unique sets of superimposed optical diffraction gratings, each one of said unique sets of gratings corresponding to a unique alphanumeric character;

input means for optically imaging selected ones of said plurality of unique sets of superimposed optical diffraction gratings onto separate regions respectively of said recording means, said imaged sets of diffraction gratings corresponding to said alphanumeric characters to be stored; and transducer means responsive to light emanating from each one of said superimposed diffraction gratings in each selected set of gratings recorded on said recording means so as to produce electrical signals corresponding to the alphanumeric characters represented by each of the selected sets of gratings recorded on said recording means.